United States Patent [19]

Jarovitzky et al.

[11] Patent Number: 4,622,356

[45] Date of Patent: Nov. 11, 1986

[54] POLYACRYLAMIDE AND POLYACRYLIC ACID POLYMERS

[75] Inventors: Peter A. Jarovitzky; Roger E. Neff, both of Stamford, Conn.

[73] Assignee: American Cyanamid Company, Stamford, Conn.

[21] Appl. No.: 753,466

[22] Filed: Jul. 10, 1985

Related U.S. Application Data

[60] Division of Ser. No. 532,340, Sep. 15, 1983, Pat. No. 4,568,731, which is a continuation of Ser. No. 155,733, Jun. 2, 1980, abandoned, which is a continuation-in-part of Ser. No. 89,803, Oct. 31, 1979, abandoned.

[51] Int. Cl.$^4$ .......................... C08F 2/00; C08F 4/00
[52] U.S. Cl. ................................. 524/100; 524/108; 524/216; 524/345; 524/346; 524/547; 524/555; 524/556; 525/328.2; 525/329.4; 525/329.7; 525/374; 525/375; 525/383; 525/386; 526/204; 526/207; 526/210; 526/287; 526/303.1; 526/304; 526/307.6; 526/317.1; 430/281; 430/294
[58] Field of Search ............... 526/204, 207, 208, 210, 526/287, 303.1, 304, 307.6, 317.1; 430/281, 294; 524/100, 108, 216, 345, 346, 555, 556, 547; 525/374, 375, 383, 386, 329.7, 329.4, 328.2

[56] References Cited

U.S. PATENT DOCUMENTS 3,488,269 1/1970 Allen et al. ............... 204/159.23
4,478,944 10/1984 Gross ................................ 435/805

OTHER PUBLICATIONS

Chem Abs 89(4) 24857y (1978) Res. Discl 1978, 167, 15.

Primary Examiner—Herbert J. Lilling
Attorney, Agent, or Firm—Frank M. Van Riet; Michael J. Kelly

[57] ABSTRACT

The use of a cyclic compound containing a

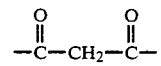

group, i.e., methone, has been found to allow a poor acrylamide or acrylic acid or 2-acrylamide-2-methyl-propane sulfonic acid and its salts monomer to be polymerized to a polymer having improved performance characteristics and/or improved rates of polymerization. Optionally, urea is added with the methone.

12 Claims, No Drawings

POLYACRYLAMIDE AND POLYACRYLIC ACID POLYMERS

CROSS REFERENCE TO RELATED APPLICATIONS

This is a division of application, Ser. No. 532,340, filed Sept. 15, 1983, now U.S. Pat. No. 4,568,781, which, in turn, is a continuation of application, Ser. No. 155,733, filed June 2, 1980, which, in turn, is a continuation-in-part of application, Ser. No. 089,803, filed Oct. 31, 1979, now abandoned.

This invention relates to water-soluble high molecular weight synthetic polymers and methods of producing the same, especially when the monomers contain an unacceptably high level of impurities, which results in poor polymer product having, for example, excessive amounts of insolubles and/or unacceptably low viscosities and/or low rates of polymerization. More specifically, it relates to the use of a cyclic compound which contains the moiety:

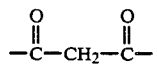

to result in polymers of acrylamide and/or acrylic acid and/or 2-acrylamido-2methyl-propane sulfonic acid and its salts which are essentially the same as those polymers prepared from especially pure monomers.

Acrylamide is conventionally prepared by the hydration of acrylonitrile as is well known in the art. This material generally exits the reactor as a concentrated (40 to 60% by weight) solution. Acrylic acid is conventionally prepared by the oxidation of propylene as is well-known in the art. This material generally is available as concentrated solutions, i.e., 60% to glacial. 2-Acrylamido-2-methylpropane sulfonic acid is conventionally prepared from acrylonitrile and sulfuric acid via the Ritter reaction. This material is available as a solid powder which often times must have been purified by recrystallization. For economical reasons it is essential that these products be directly polymerized to a water-soluble high molecular weight product. However, these monomer solutions or powders apparently contain unknown impurities at the level of parts per million, the exact amount or type being undetermined to date. When the monomers are polymerized, even with this very low level of impurities, quite often totally unacceptable polymer results.

In solution polymerizations, attempts at solving these problems required any or all of: (a) very low drying temperatures; (b) extensive and expensive purification of the monomer solution; (c) very long polymerization times; (d) addition of very large amounts of urea to the monomer; and/or (e) polymerizing in very dilute solutions. But each of these have been found unsatisfactory for large-scale commercial use due to being either energy-intensive or expensive in that the rate of production of polymers is drastically curtailed or the percent desirable polymer is reduced to an unacceptable level.

In water-in-oil emulsion polymerizations, attempts at solving these problems entailed: (a) monomer purification; (b) polymerizing very dilute solutions; (c) use of different initiators; (d) addition of urea to the monomer; and (e) use of chain transfer agents. However, these have also been found unsatisfactory for the same or similar reasons as above.

Accordingly, it is an object of the present invention to overcome this problem and to allow the polymerization of a concentrated monomer solution to occur without requiring extensive purification, i.e., crystallization.

It is a further object to reduce the insolubles content in dry, solution-polymerized polyacrylamide and polyacrylic acid polymers to a commercially acceptable level, i.e., below about 2% by weight.

It is a still further object to increase the standard viscosity of emulsion-polymerized polyacrylamide and polyacrylic acid polymers to an acceptable level, i.e. above about 4.5 centipoise and 5.0 centipoise respectively.

It is a still further object to reduce the amount of cross-linked polymer which forms during polymerization and/or during drying or milling of an acrylamide or acrylic acid or 2-acrylamido-2-methylpropane sulfonic acid polymer.

It is a still further object to increase the rate of polymerization of acrylic acid and 2-acrylamido-2-methylpropane sulfonic acid type monomers.

In accordance with the present invention there is provided an acrylamide and/or acrylic acid and/or 2-acrylamido-2-methylpropane sulfonic acid monomer solution having therein a cyclic organic compound containing a moiety of the formula

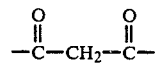

Preferably, the cyclic compound (hereafter referred to as a 1,3-dione) is present in an amount sufficient such that after polymerization of the monomer, an improved product, preferably a commercially acceptable product, results and/or the rate of polymerization is increased. For solution polymerizations, this generally means an insoluble content of below about 2% by weight. For emulsion acrylamide or acrylic acid homopolymer polymerizations, this means an insolubles content low enough to not intentionally reduce the standard viscosity below about 4.5 centipoise. If a lower viscosity emulsion polymerization product is intentionally desired, then the 1,3-dione may be used to increase the rate of reaction. For homopolymers of acrylic acid or 2-acrylamido-2-methylpropane sulfonic acid and its salts this means increasing the rate of polymerization.

There is further provided a process for producing a water-soluble, high molecular weight polyacrylamide or polyacrylic acid polymer wherein the insoluble content is reduced to below about 2% which comprises polymerizing acrylamide or acrylic acid monomer in an aqueous solution, optionally with other ethylenically-unsaturated monomers, and drying the resultant polymer, wherein at least the drying is performed in the presence of a 1,3-dione.

There is still further provided a process for producing a water-soluble, high molecular weight polymer comprising an emulsion polymerization of an acrylamide or acrylic acid or 2-acrylamido-2-methylpropane sulfonic acid monomer, optionally with other ethylenically-unsaturated the presence of a 1,3-dione.

There is still further provided a process for increasing the rate of polymerization of homopolymers of 2-acrylamido-2-methylpropane sulfonic acid and its salts wherein the polymerization is performed in the presence of a 1,3-dione.

These and other objects will be readily apparent from the detailed description which follows.

The compounds used herein to produce improved polymers are those cyclic organic compounds which contain a moiety having the formula:

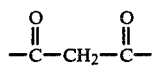

These compounds are referred to as 1,3-diones, though the moiety may be at other places in the compound.

Examples of such 1,3-diones include, but are not limited to, both substituted and unsubstituted derivatives of 1,3-cyclopentanedione; 1,3-cyclohexanedione; 1,3-cycloheptanedione; 1,3-cyclooctanedione; 1,3-cyclodecanedione; 5,5-dimethyl-1,3-cyclohexanedione; 5,5-diethyl-1,3-cyclohexanedione; 1,3,5-cyclohexanetrione and is tautometer phloroglucinol (1,3,5-trihydroxybenzene); tetrahydronaphthalene-1,3-dione; barbituric acid; and other such compounds.

The tautomers of these compounds, having the group

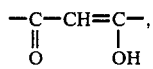

are included within the meaning of 1,3-dione as used in the present invention, as are the metal enolates including carbalkoxy dimedone metal enolates like carbomethoxy sodium enolate, carbethoxy dimedone potassium enolate and the like.

Most preferably the 1,3-dione is 5,5-dimethyl-1,3-cyclohexanedione, also known as methone or dimedone.

When the 1,3-dione is added to the monomer and the monomer then polymerized, the 1,3-dione must not also be a polymerization inhibitor. If it is an inhibitor, then it and whatever it removes must be removed from the monomer prior to polymerization. One way of so removing is by passing the monomer solution through a bed of activated carbon. Alternatively, for a solution polymerization, the 1,3-dione may be added to the polymeric gel prior to drying.

Also if the 1,3-dione is not stable under the polymerization conditions, then the polymerization conditions must be modified to avoid the destabilization or the 1,3-dione must be added to the polymeric gel prior to drying.

In some cases as detailed below it has been found desirable to include with the 1,3-dione up to about 20% by weight (based upon monomer content) urea or a urea-derivative. Preferably 5 to 10% of urea itself is used. Suitable such compounds are disclosed in U.S. Pat. No. 3,622,533 which is incorporated herein by reference. The urea may be added before, after or at the same time as the 1,3-dione.

The monomers to be polymerized herein are acrylamide, acrylic acid, and 2-acrylamido-2-methylpropane sulfonic acid and its salts. Copolymers of these named monomers or of one or more of the named monomers with other ethylenically-unsaturated monomers suitable to produce water-soluble products may also be prepared. Such other monomers include, but are not limited to, methacrylamide, salts of acrylic acid, methacrylic acid and its salts, methyl acrylate, ethyl acrylate, propyl acrylate, methyl methacrylate, ethyl methacrylate, dimethylaminoethyl acrylate, dimethylaminoethyl methacrylate, diethylaminoethyl acrylate, diethylaminoethyl methacrylate, hydroxyethyl acrylate, hydroxyethyl methacrylate, diethylaminoethyl acrylate methylsulfate, styrene, acrylonitrile, 3-(methylacrylamido)propyl-tri-methylammonium chloride, vinyl methyl ether, vinyl ethyl ether, alkali metal or ammonium salts of vinyl sulfonic acid, and the like. All or part of the acrylamide portion of the polymers may be hydrolyzed.

The polymerization method to be used herewith is any which is conventionally used to polymerize such monomers. This specifically includes solution and emulsion polymerizations though other techniques such as bead and suspension dispersion polymerizations may be used. The particular polymerization system for each of these is that which is conventionally used. For solution polymerization this generally entails using one or more azo-initiators, with or without a redox system, and optionally such conventional additives as sequesterants, alcohols and diluents as necessary to the polymerization. For emulsion polymerization, which is a water-in-oil emulsion, this entails using a water-in-oil emulsifying agent, an oil phase such as toluene, xylene, or a parafinnic oil, and a free radical initiator.

As the present invention is independent of the particular polymerization method, further details thereon may be readily found in the literature. Furthermore, the quantities and the individual components will vary according to the monomers polymerized and the process conditions under which the polymerization is to occur.

The amount of 1,3-dione to be used in accordance with the present invention has been found to depend, at least in part, upon the type of polymerization, the type of purification of the monomer, the amount of aging of the monomer/1,3-dione composition, for solution polymerizations the temperature at which the product is produced and/or dried, the presence or absence of urea and the amount thereof, the amount of impurities in the concentrated monomer solution, as well as the residence time of the polymer at the maximum temperature. As such, an exact "polymer improving amount" cannot be defined. Generally, however, it will range from about 0.001 to 2% weight (though more can be used) based upon the monomer, and more particularly with emulsion polymerizations using the larger amounts and solution polymerizations the smaller amounts. For emulsion polymerizations the preferred amount for unaged or room temperature aged solutions is about 0.3 to 1% and the most preferred is about 0.4 to 0.7% by weight. When accelerated aging (over about 50° C. for more than about 2 hours) is used, the preferred amount is from about 0.005 to 0.2%, and the most preferred 0.007 to 0.1%. For solution polymerizations the preferred amount is about 0.03 to 0.4% and the most preferred is about 0.05 to 0.25% by weight.

For solution polymerizations of acrylamide and acrylic acid it has been found advantageous to (a) purify the concentrated monomer solution by bringing it into contact with a cation exchange resin and/or activated carbon—it is not known what is removed by these steps, but improved results have been observed; (b) additionally use urea when the drying temperature is above about 80° C., especially at above 85° C., and most especially at 90° C. or above; and (c) use the monomer/1,3-dione solution as soon as possible, i.e. without extensive aging. Moreover, the advantages of the present invention may also be realized by adding the 1,3-dione, not to the monomer, but rather to the resultant polymeric gel before drying thereof. This is not as desirable in that there may be great difficulty in uniformly mixing the 1,3-dione into the gel. This shows that, however the 1,3-dione is operating, it seems to work during the drying stage of a solution polymerization.

For emulsion polymerizations it has been found advantageous to (a) age the monomer/1,3-dione composition for above five days prior to use, or (b) age the composition at elevated temperature for a few hours (60°–80° C. for about 5 hours) prior to use. This aging has been found to enhance the efficiency of the 1,3-dione. However, beneficial effects have been realized without aging by using larger quantities of the 1,3-dione, i.e., about 0.9 to 2% based upon monomer.

To prepare the acrylamide or acrylic acid/1,3-dione solutions of the present invention, it has been found advantageous to dissolve the 1,3-dione in the concentrated solution of monomer prior to any dilution for polymerization purposes. This is due to the entended time found to be needed to dissolve the 1,3-dione into a dilute solution though essentially no difference in performance has been noted. To prepare the 2-acrylamido-2-methylpropane sulfonic acid/1,3-dione solutions, the two may be simply mixed with water.

Alternatively, the 1,3-dione may be incorporated into the acrylonitrile or propylene from which the monomers are prepared.

The following specific examples illustrate certain aspects of the present invention and, more particularly, point out the benefits obtained hereby. However, the examples are set forth for illustration only and are not to be constructed as limitations on the present invention except as set forth in the appended claims. All parts and percentages are by weight unless otherwise specified.

EXAMPLE 1

Preparation of Acrylamide/1,3-Dione Solutions (a) To a polyethylene-lined vessel, preferably the one in which the subsequent polymerization will occur if it is a solution polymerization, was added 810.9 g of 51.3% aqueous acrylamide "as is" and 0.83 g of methone. This mass was magnetically stirred in air for about 5 minutes to effect solution of the methone. It contained 0.2% methone based upon acrylamide monomer.

(b) The procedure of (a) was repeated except that, prior to the addition of the methone, the aqueous acrylamide was passed through a bed of cation exchange resin (Amberlite ® IR-120 of Rohm and Haas).

(c) The procedure of (a) was repeated except that, prior to the addition of the methone the aqueous acrylamide was (i) passed through a bed of cation exchange resin (Amberlite ® IR-120) and then (ii) passed through a bed of activated carbon (Nuchar WV-L 8×30 mesh).

(d) Other such solutions were prepared with varying amounts of methone as shown in the examples below.

EXAMPLE 2

Solution Polymerization of Monomer of Example 1(c)

The monomer solution of Example 1(c) was solution polymerized as follows: It was placed in a 1 gallon polyethylene reactor and magnetically stirred. The following were subsequently added while the stirring continued:
2311.2 g deionized water
4.2 ml 2% aqueous ethylenediaminetetraacetic acid
3.2 ml 10% aqueous isopropanol
16.6 ml g anhydrous sodium sulfate
4.2 g anhydrous ammonium sulfate
20.8 g urea When solution was complete, the pH of the reaction mass was adjusted to 3.0 with sulfuric acid. A nitrogen purge was started at about 1000 ml. per hr. for 30 minutes while warming the reaction mass to about 35° C. With the nitrogen purge continuing, polymerization commenced within minutes after the introduction of the catalysts:
13.3 ml of 0.0078 grams/ml of 2,2'-azobis(2,4-dimethyl-4-methoxyvaleronitrile) and
15.6 ml of 0.02 grams/ml of 2,2'-azobis(cyanovaleric acid)

The polymerization was allowed to continue substantially adiabatically by insulating the reactor. The polymerizate was allowed to experience a 29.8° C. exotherm over about a two-hour period prior to being transferred to a curing oven at approximately 70° C. where it cured for an additional 18 hours producing 3,200 grams of a stiff gel product.

The gel was subsequently cut into slivers and portions thereof dried in a convection oven to 7–10% residual volatiles at temperatures of 90°, 100°, and 113±2° C. The dried product was reduced in particle size in a Waring Blender and screened to yield product at a −20 U.S. mesh particle size.

EXAMPLE 3

Evaluation of Product of Example 2

To evaluate the product prepared in Example 2, the following was done:

0.3 grams of the product dried at each temperature was dissolved in deionized water to produce 300 grams of 0.1% aqueous polymer solution. The solution was passed through a 100 U.S. mesh weighed screen to filter out insolubles. The screen was washed with about 500 ml. deionized water at room temperature and dried at 100° C. overnight before determination of the amount of insolubles which is reported as % insolubles.

The percent residual volatiles was determined by measuring the weight loss of a 1 gram sample after drying at 100°–110° C. for two hours.

The extent of hydrolysis (% carboxyl) was determined by a conductometric titration of the carboxyl content in the polymer. The lower the number reported, the better the resultant product for non-ionics.

The "as is" viscosity was determined by dissolving 0.3 grams of product in deionized water over 2 hours to yield a 300 gram aqueous solution, filtering out the insolubles through a 100 U.S. mesh screen, and then adding enough sodium chloride to form a 1 Molar NaCl solution and determining the Brookfield viscosity thereof using a UL adaptor. This is indicative of the performance of the resultant product with the higher the number, the more desirable the final product.

The results, along with a comparison prepared by the same procedure but wherein no methone was used, are shown in Table I below. They clearly demonstrate that by adding 0.2% methone to the monomer the "as is" viscosity is greatly increased and the percent insolubles is reduced from about 60% to less than 0.4%.

TABLE I

Results of Example 2 and Comparison

| | Example 2, Drying Temp. | | | Comparisons, Drying Temp. | |
|---|---|---|---|---|---|
| | 90° C. | 100° C. | 113 ± 2° C. | 90° C. | 100° C. |
| "As is" viscosity | 3.3 | 3.3 | 3.3 | 1.4 | 1.4 |
| % Volatiles | 7.72 | 7.03 | 7.96 | 7.72 | 9.10 |
| % Insolubles | 0.03 | 0.07 | 0.40 | 60.0 | 62.4 |
| % Carboxyl | 0.075 | 0.038 | 0.19 | — | — |

EXAMPLE 4

The procedure of Examples 2 and 3 was repeated except that the amount of methone was reduced to 0.10% and 0.05% respectively.
The results were:

| | Drying Temperature, °C. | |
|---|---|---|
| | 90 | 100 |
| 0.10% Methone | | |
| "As is" viscosity | 3.3 | 3.3 |
| % Volatiles | 8.25 | 7.08 |
| % Insolubles | 0.9 | 0.7 |
| % Carboxyl | — | 0.15 |
| 0.05% Methone | | |
| "As is" viscosity | 3.3 | 3.1 |
| % Volatiles | 8.21 | 6.67 |
| % Insolubles | 1.6 | 13.1 |
| % Carboxyl | 0.15 | 0.075 |

They demonstrate that as the amount of methone is reduced, the percent of insolubles increases. And that when the amount was 0.05% and the drying temperature was 100° C., there was an insufficient amount of methone to bring the insoluble content to below 2%.

EXAMPLES 5–10

The procedure of Examples 2 and 3 was repeated except varying (1) the purification procedure and (2) the amount of methone. The results are detailed below in Table II. As can be seen therein as the amount of methone was increased, an improved product resulted (as shown by increased "as is" viscosity and reduced insolubles).

TABLE II

Results of Examples 5–10

| Example | Treatment of Monomer | Percent of Methone | Dry Product Data at 90°/100° Drying | | | |
|---|---|---|---|---|---|---|
| | | | As is Visc. | % Insol. | % Vol. | % Carboxyl |
| 5 | i | — | 1.5/1.3 | 53.5/59.1 | 8.30/8.10 | —/— |
| 6 | i | 0.05 | 2.4/2.1 | 18.1/29.1 | 7.57/6.62 | —/— |
| 7 | i | 0.20 | 3.3/3.3 | 1.7/0.8 | 7.68/8.35 | —/.075 |
| 8 | ii | 0.26 | 3.3/3.3 | 0.9/0.7 | 7.24/6.7 | .15/.075 |
| 9 | ii | 0.49 | 3.3/3.1 | 0.13/1.9 | 6.27/5.92 | .075/.038 |
| 10 | iii | 0.26 | 3.3/3.2 | 1.2/3.3 | 11.2/6.95 | 0/0 |

(i) Cation exchange resin only, as in Ex. 1b
(ii) Cation exchange resin only, aged 2–3 days at room temperature before use
(iii) Cation exchange resin, activated carbon; monomer diluted to 13% prior to adding methone

EXAMPLES 11–20

The basic procedure of Examples 2 and 3 was repeated except varying the treatment of monomer, the presence and amount of urea and methone, the catalyst system and pH, the percent solids, the maximum temperature, and the time at the maximum temperature as detailed below in Table IIIa. As to treatment of monomer, "YES" means that it was cation exchange treated as in Example 1b and "NONE" means it was prepared as in Example 1a. The % (NH4)2SO4 in Example 2 was 1%; the % Na2SO4 was 4%, and the % urea was 5%.

The dry product data are given in Table IIIb.

To show that the 1,3-dione and/or urea may be omitted from the monomer and added to the gel, thereby being present only during the drying stage, various post additions were made as follows:

Ex. 15—post added 0.1% methone and 10% urea
Ex. 16—post added 0.1% methone only
Ex. 19 and 20—post added 10% urea only The dry product data for these are also shown in Table IIIb.

As can be seen from the data in Tables IIIa and IIIb, the effect of methone is independent of the catalyst system or polymerization conditions and there is a benefit from using a combination of methone and urea.

TABLE III

| Example | Treatment of Monomer | % Methone | % Urea | % (NH4)2SO4 | % Na2SO4 | Catalyst pH | % Solids | T,max °C. | Time at T,max |
|---|---|---|---|---|---|---|---|---|---|
| 11 | yes | 0.2 | —* | 1.0 | 9.0 | A | 13 | 70 | 20 |
| 12 | yes | 0.2 | 5.0 | 1.0 | 4.0 | A | 13 | 70 | 20 |
| 13 | yes | 0.05 | 5.0 | 1.0 | 4.0 | A | 13 | 70 | 20 |
| 14 | yes | 0.05 | 10.0 | 3.0 | — | A | 13 | 70 | 20 |
| 15 | none | — | — | 3.0 | 10.0 | B | 11.3 | 65 | 20 |
| 16 | none | — | 10.0 | 3.0 | — | B | 11.3 | 65 | 20 |
| 17 | yes | 0.1 | 10.0 | 3.0 | — | B | 11.3 | 65 | 20 |
| 18 | yes | 0.1 | 10.0 | 3.0 | — | B | 11.3 | 65 | 20 |
| 19 | yes | 0.1 | — | — | — | B | 11.3 | 65 | 20 |
| 20 | yes | 0.1 | — | — | — | B | 11.3 | 65 | 20 |

| | Dry Product Data at 90°/100° C. Drying | | | | | |
|---|---|---|---|---|---|---|
| | No Post Additions | | | Post Additions to Gel | | |
| Example | As is Visc. | % Insol | % Vol | As is Visc. | % Insol | % Vol |
| 11 | 1.5/1.5 | 50.3/49.2 | 8.21/7.65 | — | — | — |
| 12 | 3.3/3.3 | 1.7/0.8 | 7.68/8.35 | — | — | — |
| 13 | 1.7/2.2 | 39.7/23.5 | 6.83/7.55 | — | — | — |
| 14 | 3.4/3.2 | 0.8/4.5 | 8.63/7.86 | — | — | — |

TABLE III-continued

| | | | | | | |
|---|---|---|---|---|---|---|
| 15 | 1.2/1.2 | 60.7/63.6 | 12.6/9.8 | 3.2/3.4 | 0.13/8.5 | 9.62/4.43 |
| 16 | 3.0/2.1 | 11.9/34.3 | 10.5/9.1 | 3.6/3.2 | 4.3/4.2 | 8.02/5.21 |
| 17 | 3.5/3.2 | 1.4/11.0 | 9.0/8.5 | — | — | — |
| 18 | 3.6/3.3 | 0.8/5.5 | 8.2/6.7 | — | — | — |
| 19 | 1.8/— | 48.9/— | 9.4/— | 3.6/— | 0.57/— | 9.7/— |
| 20 | 2.4/— | 40.1/— | 8.8/— | 3.7/— | 1.0/— | 7.1/— |

Catalyst/pH-A is same as Ex. 2; B is 2,2'-azobis(2-amidinopropane)hydrochloride, pH 4.5
*0.1% piperidine added initially

EXAMPLES 21–28

The basic procedure of Examples 2 and 3 was repeated except that the following were used: different untreated monomer, 27% solids, diethylenetriaminepentaacetic acid as the sequesterant, 2,2'-azobix(2-amidinopropane)hydrochloride as the catalyst with an ammonium persulfate/ferrous ammonium sulfate redox system, pH of 6.0, initiation of reaction at 0° C., and a residence time of four hours.

The amounts of methone and urea used as well as the dry product data for product dried at about 60°–70° C. to about 12% volatiles is shown in Table IV below.

As can be seen under these polymerization conditions, methone alone produced acceptable product (high as is viscosity and insolubles below about 2%) whereas urea alone did not.

TABLE IV

Results of Examples 21–28

| | | | Dry Product Data | |
|---|---|---|---|---|
| Example | % Methone | % Urea | As is Visc. | % Insol |
| 21 | — | — | 3.9 | 7.3 |
| 22 | 0.01 | — | 4.4 | 1.8 |
| 23 | 0.05 | — | 4.6 | 1.3 |
| 24 | 0.1 | — | 4.6 | 0.6 |
| 25 | — | — | 3.8 | 8.2 |
| 26 | — | 1.0 | 3.1 | 7.0 |
| 27 | — | 2.5 | 4.3 | 6.1 |
| 28 | — | 5.0 | 4.1 | 6.7 |

EXAMPLES 29–38

Emulsion Polymerization of Acrylamide

Methone was added to aqueous acrylamide solutions as in Example 1a with stirring for about 5 minutes. The following procedure was used, except that when the pH was 9, sodium hydroxide was added.

To a suitable reaction vessel are added 2100.0 parts of acrylamide, as a 50.47% aqueous solution, and 850.0 parts of deionized water. To this solution is added 2.12 parts of the disodium salt of ethylenediamine tetraacetic acid and 1.15 parts of hydrated ferric sulfate (72% $Fe_2(SO_4)_3$) used as 4.5 parts/1000 parts $H_2O$). The pH of the resultant solution is adjusted to 5.0. This constitutes the aqueous monomer phase.

The oil phase is prepared by dissolving 90.0 parts of sorbitan monooleate in 1040.0 parts of AMSCO OMS, a commercially available, clear oily liquid sold by Union Oil Co. of California.

To a suitable, high speed homogenizer is added the complete oil phase system. The homogenizer is started and the monomer aqueous phase is slowly added thereto to form an emulsion having a viscosity of 990 cps. The dispersed phase of the resultant emulsion has a particle size of about 2.5 microns or less.

To a suitable reaction vessel is added the complete emulsion system with stirring. 70.0 Parts per million (based on monomer) of t-butyl hydroperoxide are added. The resultant media is purged with nitrogen gas to remove oxygen from the system. Stirring continues, and sodium metabisulfite is slowly pumped into the vessel over a period of 6 hours while maintaining the vessel at about 40° C. after which about 100 parts per million (based on monomer) have been added. The resultant viscous emulsion exhibits 99.49% conversion of acrylamide.

Stabilization of the polymer emulsion is accomplished by adding 78.28 parts of a 30% aqueous sodium metabisulfite solution. The emulsion is maintained under polymerizing conditions (60 minutes at 40° C.) to substantially completely react the remaining acrylamide. 0.4% of the emulsion comprises bisulfite which effects stabilization of the polymer system.

To the resultant polymer emulsion are added, as an inverting agent mixture over a period of 30 minutes 5.5% of a 70% solution of sodium bis(2-ethylhexyl)sulfosuccinate in AMSCO OMS and 2.0% of the reaction product of 1 mole of octyl phenol and 7.5 moles of ethylene oxide. The resultant emulsion is held at 40° C. for an additional hour after which time the product is smooth and particle free. The dispersed polymer phase has a particle size of 2.5 microns or less. The standard viscosity is as shown in Table V.

The standard viscosity of the resultant product, as well as those of other products varying the amount of methone and degree of aging, are shown in Table V below.

TABLE V

Results of Use of Methone in Emulsion Polymerization
Results of Examples 29–38

| Example | % Methone | Aging, Days | pH | Std. Viscosity |
|---|---|---|---|---|
| 29 | — | — | 5 | 3.5 |
| 30 | 0.5 | — | 5 | 3.9 |
| 31 | 0.75 | — | 5 | 4.2 |
| 32 | 1.0 | — | 5 | 4.7 |
| 33 | 1.5 | — | 5 | 4.5 |
| 34 | 0.2 | 5 | 9 | 4.0 |
| 35 | 0.5 | 5 | 9 | 5.0 |
| 36 | 0.2 | 7 | 5 | 4.3 |
| 37 | 0.5 | 7 | 5 | 4.9 |
| 38 | 0.1 | * | 5 | 4.95 |

*Accelerated Aging, 60–80° C. for 5 hours.

EXAMPLES 39–42

Preparation of Copolymers

The basic procedure of Example 2 is repeated except that 10% by weight of the acrylamide is replaced by an equivalent weight of each of the following monomers:
(a) Acrylic acid
(b) 2-Acrylamido-2-methylpropane ammonium sulfonate
(c) Dimethylaminoethylmethacrylate methyl sulfate.

For (a) and (b) the pH is adjusted with sodium hydroxide.

Comparable improved results over those same copolymers without methone are observed.

EXAMPLE 43

Preparation of 95/5 Acrylic Acid/Acrylamide Copolymer

To a stainless steel beaker was charged 214 g. of glacial acrylic acid (Rohm and Haas Production Grade). While stirring with a magnetic stirrer, 29% aqueous ammonia (technical) was added and the temperature was maintained at $\leq 35°$ C. until the pH became 7.5 (about 1.5 hours). Distilled water was added to bring the total weight of 428 g. The solution was transferred to a 1 liter glass beaker and while stirring 1.07 g. of methone was added (0.5% based on the acrylic acid). It dissolved in about 10 minutes. Then 23 g. of 50% acrylamide was added and the procedure of Examples 29–38 was followed to emulsion polymerize the monomers.

The standard viscosity was 5.7 centipoise.

When the above was repeated without methone, the standard viscosity was less than 2.9 centipoise.

EXAMPLE 44

Preparation of Acrylic Acid Homopolymer

The procedure of Example 43 was repeated to homopolymerize acrylic acid. It had a standard viscosity of 5.2 cps. When no methone was added, the standard viscosity was 2.5 cps.

EXAMPLES 45–50

The procedure of Example 2 was repeated except that the methone was replaced by the additives listed in Table VI below in the amounts specified therein. The results of drying the polyacrylamide at 90° C. are also given in the Table. As can be seen the carbethoxy dimedone sodium enolate, which may be an intermediate in the preparation of methone, provided the best results of the additives tested.

TABLE VI

| | | | Dry Product Data at 90° C. Drying | | |
|---|---|---|---|---|---|
| Example | Additive | % Added | As Is Visc. | % Vol. | % Insol. |
| Standard | None | — | 1.3 | 8.8 | 57.5 |
| 45 | 1,3-Cyclohexanedione | 0.12 | 3.3 | 7.8 | 6.5 |
| 46 | Phloroglucinol | 0.17 | 2.4 | 9.1 | 29.7 |
| 47 | Barbituric acid | 0.14 | 3.0 | 10.8 | 14.1 |
| 48 | Carbethoxy dimedone sodium enolate | 0.167 | 3.5 | 8.4 | 3.1 |
| 49 | | 0.25 | 3.5 | 8.8 | 0.07 |
| 50 | | 0.167 | 3.6 | 10.3 | 0.03 |

EXAMPLE 51

1,3-Indandione

The procedure of Example 2 was repeated except that the methone was replaced by 0.05% by weight of 1,3-indandione:

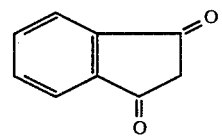

The monomer would not polymerize as the 1,3-indandione was an inhibitor thereto.

The procedure of Example 15 was repeated to make a post addition of 1,3-indandione (0.2%) and urea (5.0%). Thus the polymer, prepared with no additives, was dried in the presence of the additives. The results of a 90° C. drying were as follows:

As is Viscosity: 2.9
% Volatiles: 7.4
% Insolubles: 0.13

Thus the insoluble content was below about 2%.

EXAMPLE 52

Meldrums Acid

The procedure of Example 2 was repeated except that the pH was varied and the methone was replaced by 0.103% Meldrum's acid:

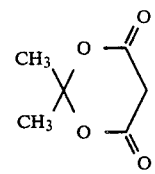

Two polymerizations were run, one at pH 4.5 and one at pH 8.0. As can be seen from the data below, at the higher pH an improved product resulted. Accordingly, it is apparent that the 1,3-dione, if present during the polymerization, and not just as a post additive, must be stable under the conditions of polymerization to be effective.

The result of products dried at 90° C. were as follows:

| | pH 4.5 | pH 8.0 |
|---|---|---|
| As is Viscosity | 1.4 | 2.1 |
| % Volatiles | 9.9 | 9.2 |
| % Insolubles | 60.0 | 38.5 |

EXAMPLES 53–64

Following the basic procedure of Example 2, the copolymers and homopolymers identified in Table VII were prepared. Controls without methone were also prepared.

In the Table, AMD is acrylamide; AMPS is 2-acrylamido-2-methylpropane sulfonic acid; AN is acrylonitrile; and MAPTAC is 3-(methylacrylamido)-propyltrimethylammonium chloride. WNF means that the product would not filter and thus a percent insolubles determination could not be made.

Examples 57 and 58 included 5% urea and were run at 10.3% solids. Examples 59–62 were performed in the absence of urea and at 13% solids. Examples 63 and 64 were prepared in the absence of urea and a redox system but with sodium hydroxide to adjust the pH.

For the 100% AMPS examples, 63 and 64, the average rates of polymerization expressed as degrees centigrade exotherm/minute adiabaticly were determined to be as follows:

| Example | Methone | Rate |
|---|---|---|
| 63 | NO | 0.07%/min |
| 64 | YES | 0.14%/min. |

Thus the use of methone doubled the rate of polymerization.

In Examples 53–62, the effect of using methone to reduce the amount of insolubles is demonstrated.

TABLE VII

Results of Examples 53–.

| | | | 90° C. Dry Product Data | | |
|---|---|---|---|---|---|
| Example | Monomer of Mole % | Weight % Methone | As is Visc. | % Volatiles | % Insolubles |
| 53 | 1-AN,99-AMD | — | 1.3/1.2 | 8.9/8.1 | 59.3/62.9 |
| 54 | 1-AN,99-AMD | 0.1 | 3.4/2.9 | 8.8/7.9 | 7.3/13.0 |
| 55 | 10-MAPTAC,90-AMD | — | 2.9/— | 7.7/— | 7.7/— |
| 56 | 10-MAPTAC,90-AMD | 0.15 | 2.7/— | 9.1/— | 0.13/— |
| 57 | 5-AMPS, 95-AMD | — | 3.2/3.0 | 9.5/8.4 | 0.7/12.1 |
| 58 | 5-AMPS, 95-AMD | 0.1 | 3.0/3.0 | 9.5/8.0 | None/None |
| 59 | 5-AMPS, 95-AMD | — | 3.0/3.0 | 8.4/9.6 | WNF/WNF |
| 60 | 5-AMPS, 95-AMD | 0.1 | 3.3/3.3 | 8.7/8.1 | None/0.2 |
| 61 | 10-AMPS, 90-AMD | — | NO REACTION OCCURRED | | |
| 62 | 10-AMPS, 90-AMD | 0.1 | 2.9/2.9 | 9.6/8.5 | None/None |
| 63 | 100 AMPS | — | —/1.3 | —/6.3 | —/0.63 |
| 64 | 100 AMPS | 0.1 | —/1.4 | —/8.9 | —/0.10 |

EXAMPLE 65

The procedure of Example 1 (a) is repeated to prepare a solution of acrylamide containing 0.2% methone. The solution is allowed to stand overnight and is then passed through a bed of activated carbon (Nuchar WV-L 8×30 mesh).

The resultant monomer, with no methone present is polymerized in accordance with Example 2 above. The polymeric product is dried at 90° C. and has an as is viscosity of over 2.8 and less than 2% insolubles.

What is claimed is:

1. In a process for producing a water-soluble high molecular weight polymer by polymerizing a monomer selected from acrylamide, acrylic acid, 2-acrylamido-2-methylpropane sulfonic acid and its salts, or mixtures thereof, and drying the resulting polymer, the improvement comprising adding to said polymer, after polymerization and before drying, a cyclic organic compound which contains a 1,3-dione moiety of the formula:

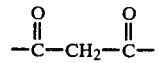

2. The process of claim 1 wherein the 1,3-dione is present as about 0.001 to 2% by weight of the monomer.
3. The process of claim 1 wherein the monomer is acrylamide.
4. The process of claim 1 wherein the monomer is acrylic acid.
5. The process of claim 1 wherein the monomer is 2-acrylamido-2-methylpropane sulfonic acid and its salts.
6. The process of claim 1 wherein the monomer is a mixture of acrylamide and acrylic acid.
7. The process of claim 1 wherein the monomer is a mixture of acrylamide and 2-acrylamido-2-methylpropane sulfonic acid and its salts.
8. The process of claim 1 wherein the 1,3-dione is 5,5-dimethyl-1,3-cyclohexanedione or its tautomer 5,5-dimethyl-tetrahydro-m-resorcinol.
9. The process of claim 1 wherein the 1,3-dione is selected from the group consisting essentially of 1,3-cyclohexanedione, phloroglucinol, barbituric acid, carbmethoxy dimedone enolate, and carbethoxy dimedone enolate.
10. The process of claims 1, 8 or 9 wherein at least one additional ethylenically-unsaturated monomer is copolymerized with the monomer to produce a water soluble polymer.
11. The process of claims 1, 8 or 9 wherein urea is added to the monomer before polymerization.
12. The process of claims 1, 8 or 9 wherein urea is also added after polymerization, before, after or at the same time as the 1,3-dione and before drying.

* * * * *